(12) United States Patent
Hauck

(10) Patent No.: US 8,059,835 B2
(45) Date of Patent: Nov. 15, 2011

(54) IMPULSIVE COMMUNICATION ACTIVATED COMPUTER CONTROL DEVICE AND METHOD

(75) Inventor: Lane T. Hauck, San Diego, CA (US)

(73) Assignee: Emmanuel Thibaudeau, Duclair (FR)

( * ) Notice: Subject to any disclaimer, the term of this patent is extended or adjusted under 35 U.S.C. 154(b) by 1192 days.

(21) Appl. No.: 11/024,110

(22) Filed: Dec. 27, 2004

(65) Prior Publication Data

US 2006/0143326 A1 Jun. 29, 2006

(51) Int. Cl.
*H03G 3/20* (2006.01)
(52) U.S. Cl. .............. 381/110; 381/56; 345/156
(58) Field of Classification Search .......... 381/56–59, 381/104–110, 61; 341/20–35; 710/67, 18, 710/62–63; 345/165, 156, 169, 170, 175; 713/171–172, 184–186, 310, 323, 159; 700/94
See application file for complete search history.

(56) References Cited

U.S. PATENT DOCUMENTS

| | | | | |
|---|---|---|---|---|
| 4,776,016 A * | 10/1988 | Hansen | ............ | 704/275 |
| 5,615,270 A * | 3/1997 | Miller et al. | ............ | 381/57 |
| 5,615,271 A * | 3/1997 | Stevens et al. | ............ | 381/110 |
| 6,229,577 B1 * | 5/2001 | Barth et al. | ............ | 348/602 |
| 6,429,854 B1 * | 8/2002 | McKown | ............ | 345/168 |
| 6,927,756 B1 * | 8/2005 | Hauck | ............ | 345/156 |
| 7,126,585 B2 * | 10/2006 | Davis et al. | ............ | 345/166 |
| 7,346,855 B2 * | 3/2008 | Hellyar et al. | ............ | 715/783 |
| 7,346,933 B2 * | 3/2008 | Gliniecki et al. | ............ | 726/34 |
| 7,549,161 B2 * | 6/2009 | Poo et al. | ............ | 726/5 |
| 2001/0009027 A1 * | 7/2001 | Shiga | ............ | 713/300 |
| 2003/0005278 A1 * | 1/2003 | Deng et al. | ............ | 713/2 |
| 2004/0263477 A1 * | 12/2004 | Davenport et al. | ............ | 345/163 |
| 2005/0060563 A1 * | 3/2005 | Chen | ............ | 713/200 |
| 2006/0028433 A1 * | 2/2006 | Myrick | ............ | 345/156 |

* cited by examiner

*Primary Examiner* — Vivian Chin
*Assistant Examiner* — Fatimat O Olaniran
(74) *Attorney, Agent, or Firm* — Bernard L. Kleinke; Duckor Spradling Metzger & Wynne

(57) ABSTRACT

An impulsive communication activated device for connection to a computer input port for controlling a computer, is disclosed. The disclosed device includes an output connector for communicating with the computer input port, and includes a sensor for detecting an impulsive communication such as a hand clap or other predetermined input, to generate an impulsive signal. The disclosed device includes a comparator for responding to both a reference signal and to the impulsive signal, and to determine if the impulsive signal differs substantially from the reference signal to generate a start signal. The disclosed device includes a logic circuit responsive to the start signal for generating a predetermined computer command signal to control the computer.

9 Claims, 5 Drawing Sheets

US 8,059,835 B2

IMPULSIVE COMMUNICATION ACTIVATED COMPUTER CONTROL DEVICE AND METHOD

FIELD OF THE INVENTION

The present invention relates in general to an impulsive communication activated computer control device and method. The invention more particularly relates to a device and method for controlling a computer such as a personal computer via its USB port upon detection of impulsive light, sound, or other signals from a person.

BACKGROUND ART

There is no admission that the background art disclosed in this section legally constitutes prior art.

There have been a variety of user activated devices for controlling different types and kinds of equipment. For example, sound activated controllers that turn lights on and off when a person claps hands are well known in the art. Such a device has been marketed under the trade name "The Clapper," and has been available from www.drugstore.com.

Another example of prior known use activated control devices include personal computer panic buttons. These are computer programs that, when the user strikes a particular sequence of keys on the personal computer keyboard, the personal computer screen is erased of its contents. Thus, for example, a game screen can be cleared and a substitute screen, such as a spreadsheet, can then appear to indicate that legitimate work is being accomplished on the personal computer in the workplace.

BRIEF DESCRIPTION OF THE DRAWINGS

The features of this invention and the manner of attaining them will become apparent and the invention itself will be best understood by reference to the following description of certain embodiments of the invention taken in conjunction with the accompanying drawings, wherein.

DETAILED DESCRIPTION OF CERTAIN EMBODIMENTS OF THE INVENTION

Figure 1:
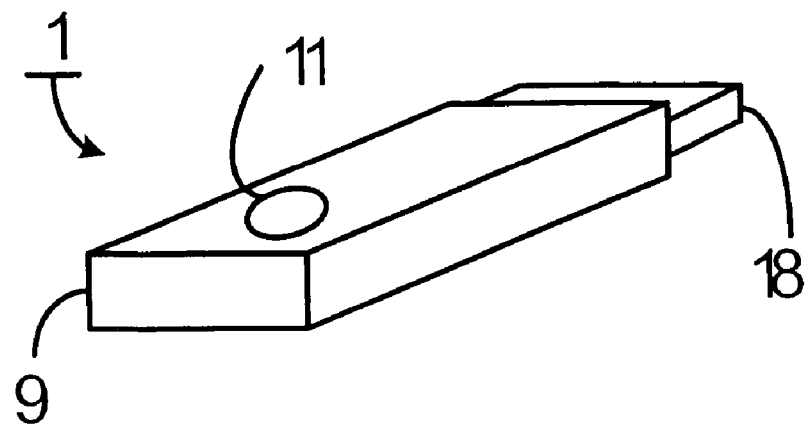
FIG. 1 is a diagrammatic pictorial view of the impulsive communication activated computer control device constructed in accordance with an embodiment of the present invention.

It will be readily understood that the components of the embodiments as generally described and illustrated in the drawings herein, could be arranged and designed in a wide variety of different configurations. Thus, the following more detailed description of the embodiments of the system, components and method of the present invention, as represented in the drawings, is not intended to limit the scope of the invention, as claimed, but is merely representative of the embodiments of the invention.

An impulsive communication activated device for connection to a computer input port for controlling a computer, is disclosed. The disclosed device includes an output connector for communicating with the computer input port, and includes a sensor for detecting an impulsive communication such as a hand clap or other predetermined input, to generate an impulsive signal. The disclosed device includes a comparator for responding to both a reference signal and to the impulsive signal, and to determine if the impulsive signal differs substantially from the reference signal to generate a start signal. The disclosed device includes a logic circuit responsive to the start signal for generating a predetermined computer command signal to control the computer.

According to other embodiments of the present invention, there is provided an impulsive communication activated device for connection to a computer input port for controlling a computer that includes an output connector for communicating with the computer input port. The disclosed device further includes a sensor for generating a start signal in response to an impulsive communication, and a memory which stores a predetermined series of human interface device signals. The disclosed device includes a microprocessor responsive to the start signal for retrieving and sending the series of signals to the computer for control purposes.

According other embodiments of the present invention, there is provided a method for controlling a computer via an impulsive communication activated device having an output connector connected to a computer input port. The method includes storing a reference signal, detecting an impulsive communication and generating an impulsive signal. The method further includes comparing the reference signal to the impulsive signal to generate a start signal and responding to the start signal for generating a predetermined computer command signal to control the computer to cause it to execute a predetermined operation.

According to other embodiments of the present invention, there is provided a method for controlling a computer via an impulsive communication activated device having an output connector connected to a computer input port. The method includes generating a start signal in response to an impulsive communication. The method further includes storing a predetermined series of human interface device signals and retrieving and sending those signals in response to the start signal via a microprocessor for controlling the computer.

Figure 2:
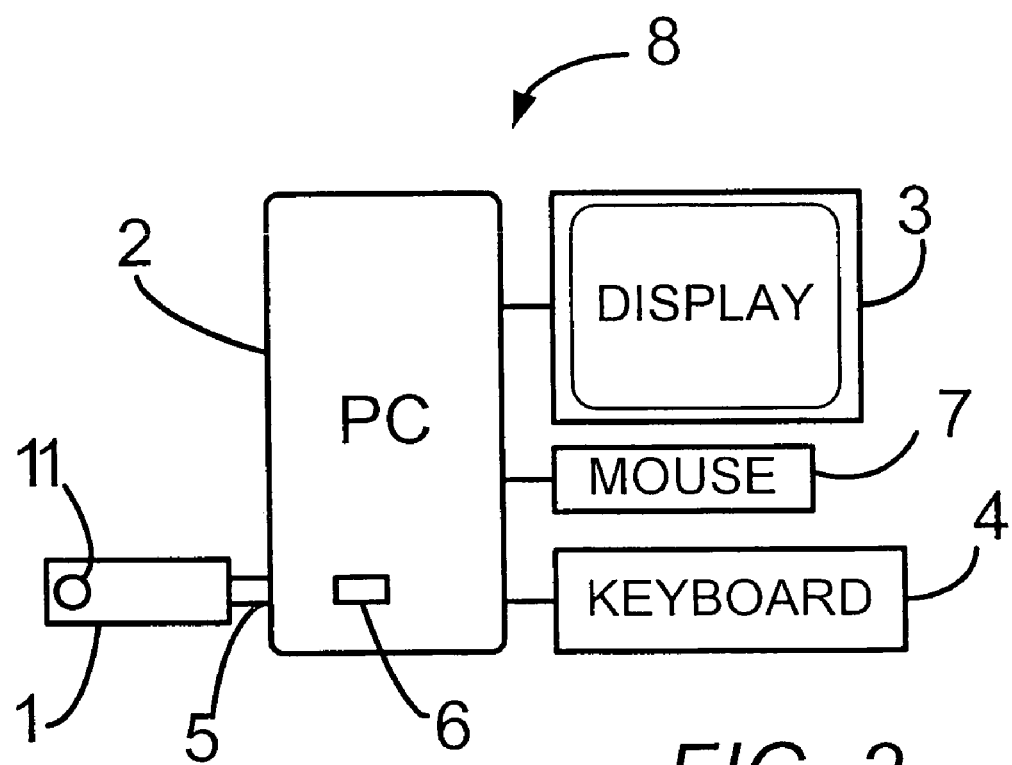
FIG. 2 is a diagrammatic view of the device of FIG. 1, illustrating the device being coupled to a computer.

Referring now to FIGS. 1 and 2, there is shown an impulsive communication activated computer control device 1 for controlling a computer 8 upon the detection of an impulsive communication signal in accordance with an embodiment of the invention. The device 1 detects impulsive sound stimuli such as handclaps, shouting, and others, and plugs into a conventional Universal Serial Bus (USB) input port such as ports 5 and 6 (FIG. 2), of the personal computer 8. The device includes a microprocessor 15 (FIG. 3), USB interface hardware such as a USB controller 16 (FIG. 3), and a memory 27 for storing computer program (partially shown in accompanying Appendices A and B). The program creates a standard USB device that automatically is recognized and serviced by the conventional operating system of the computer 8, thereby eliminating the requirement for any special hardware or software.

The microprocessor stored program contains code that configures the device as a standard USB class, called the Human Interface Device (HID) class. Specifically, the HID device implemented by the disclosed embodiment of the invention is a standard USB keyboard implementation. Thus, the device 1 is able to send data signals that represent keystrokes to the personal computer 8 as if the data signals came from a conventional keyboard coupled electrically to the personal computer 8. The nature of a USB HID keyboard implementation is that more than one keyboard may be attached at a time, and they all work independently as input devices to the operating system. Therefore, sending key codes from the device 1 may mimic the user striking the key on a conventional keyboard that sends the same key codes. In this way, the device 1 may send any keystroke signal or keystrokes signals to the personal computer 8, and these keystroke emulating signals may be automatically handled by the computer operating system as it handles any conventional keyboard keystroke signals. This embodiment of the disclosed embodiment of the present invention may eliminate the requirement for custom software.

As shown in FIG. 1, the device 1 includes an elongated housing or compact package 9. A microphone 11 is mounted within the housing 9 opposite an opening therein for detecting an impulsive sound such as a handclap or other predetermined loud noise or sound. The USB connector 18 plugs into an input port such as USB input ports 5 and 6 of a conventional personal computer to allow the device 1 to draw power from the personal computer and also to communicate with the personal computer over USB hardware as is well known in the art of computer communications.

Referring now to FIG. 2, the personal computer 8 includes a computer 2, a display 3, a keyboard 4, the two USB input ports 5 and 6, and a mouse 7. The device 1 is shown to be attached to the USB input port 5. Although the personal computer 8 depicts a desktop computer configuration, other computers such as a laptop computer (not shown), with the display, keyboard, USB input ports, and a mouse built into a single portable unit, may also be employed. The personal computer 2 runs a standard operating system such as Microsoft Windows, available from Microsoft Corp., Redmond, Wash.

When the USB plug connector 18 (FIG. 1) on the device 1 is inserted into one of the USB input port such as USB input port 5, the personal computer operating system recognizes the device 1 as an additional standard keyboard, equivalent to its conventionally attached keyboard 4. The microphone 11 in the device 1 may sense an impulsive sound such as a handclap or other predetermined sound, by responding only to sharp sounds louder than the ambient sound level. When the device 1 detects such a sound, the device 1 sends a first signal over the USB connector 18 (FIG. 1) to the personal computer 8 which causes the personal computer 8 to alter the contents of its display 3 in a dramatic way. For example, the screen may close all of the windows currently open on the display. Another detected sound may cause the device 1 to send a second signal over the USB connector 18 (FIG. 1) to instruct the personal computer 8 to take a different operation, such for example, as restoring its screen to the original display. The signals sent over USB connector 18 (FIG. 1) may be arranged to appear as coming from the standard keyboard 4 so that no special software may be necessary to operate the device 1 as described hereinafter.

When the personal computer 8 assumes a unique state, such as its suspend or standby low power state, it is normally reactivated by striking a key on the keyboard 4 or moving the mouse 7 coupled to the computer. A further feature of the device 1 is that when the personal computer 8 is in standby mode, a detected impulsive sound may reactivate the computer just as if the operator had struck a keyboard key on the keyboard 4 or moved the mouse 4. This feature of the device 1 depends on the ability of the personal computer to re-activate from its standby state by responding to activity over one of its USB input ports 5 or 6.

Figure 3:
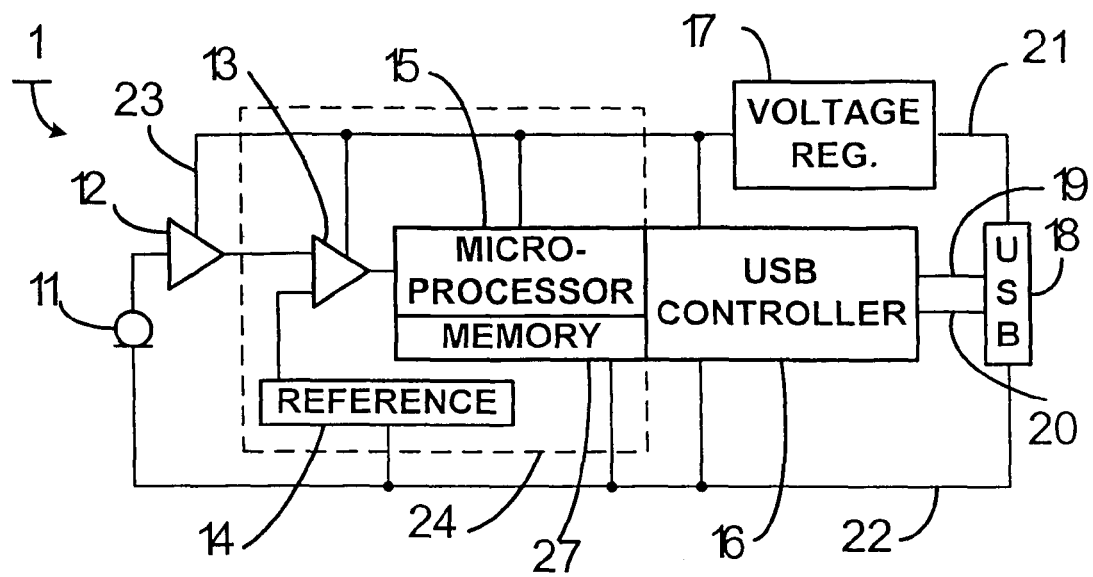
FIG. 3 is a circuit diagram of the device of FIG. 1.

With reference to FIG. 3, the microphone 11 may be a low cost microphone, for example an electret microphone of the type widely used in cell telephones, and an amplifier 12 may amplify the microphone signal to a usable level. The output of the amplifier 12 may be connected to one input of a voltage comparator 13, the other input of which may be connected to a voltage reference circuit 14. The voltage reference circuit 14 may determine the microphone signal amplitude, and therefore the loudness of the acoustic signal detected by the microphone 11, which may cause comparator 13 to make a transition on its output. The transition may be detected by a microprocessor 15 which may be coupled to the output of the comparator 13. The reference may therefore function as a means to adjust the detection threshold of a predetermined impulsive signal such as a given sound. Voltage reference circuit 14 may be a simple potentiometer which may be manually adjusted by the user, or an adjustable reference under control of the microprocessor 15. Dotted line 24 indicates that the comparator 13 and the reference circuit 14 may alternately be integral with the microprocessor 15. For example, the Atmel AVR family of microprocessors, available from Atmel Corp, San Jose Calif., has low cost microprocessor chips such as the AtTiny13 with built-in comparators and programmable voltage references. Similar low cost microprocessors with this configuration are also available from Microchip Corporation, Chandler, Ariz., and other vendors.

The microprocessor 15 and the memory 27 may connect to the USB controller 16, which may implement the necessary logic to communicate with a USB host such as the personal computer 8 (FIG. 2). The controller 16 may be built into the microprocessor 15, or it may be a low cost interface chip that is readily connected to the microprocessor 15, for example the Maxim MAX3420E, available from Maxim Integrated Products, Sunnyvale, Calif.

The USB controller 16 may connect to the USB connector 18, which may be a male connector of USB type "A". The connector 18 may mate with USB input ports on most personal computers. The USB connector 18 may contain four signals such as signal leads 19, 20, 21 and 22. The signal leads 19 and 20, named DPLUS and DMINUS respectively, are the signals used to communicate USB data between the device 1 and the personal computer 8 (FIG. 2), as is well known in the art. The signal lead 21 is named Vbus, on which the personal computer 8 (FIG. 2) may provide a source of 5 volt power, at a minimum of 100 milliamps. Due to the presence of this signal, the inventive device 1 may draw power from the USB connector 18, and therefore may not require a power source of its own such as a battery. The signal lead 22 on the USB connector 18 is the system ground reference.

These and other details of USB signals and operation are contained in the USB Specification, Version 2.0, which may be downloaded from the web site www.usb.org and is incorporated herein by reference in its entirety.

With further reference to FIG. 3, the voltage regulator 17 is a low cost linear regulator, which may convert the 5 volt Vbus signal on lead 21 to a stable and low noise source of 3.3 Volt power on signal lead 23. The regulator may compensate for the range of voltages that may be encountered on the Vbus pin or lead 21, which by USB specification may range from 4.4 Volts to 5.25 Volts. The regulator 17 must have low standby current to allow the device 1 to meet the suspend current requirement of the USB specification. When a USB device is put into the suspended state, it is permitted to consume no more than 500 microamps. An exemplary voltage regulator for this purpose is the Maxim MAX6349TLUT, which supplies 3.3 volts at 150 milliamps and has a maximum standby current of 50 microamps.

Figure 4:
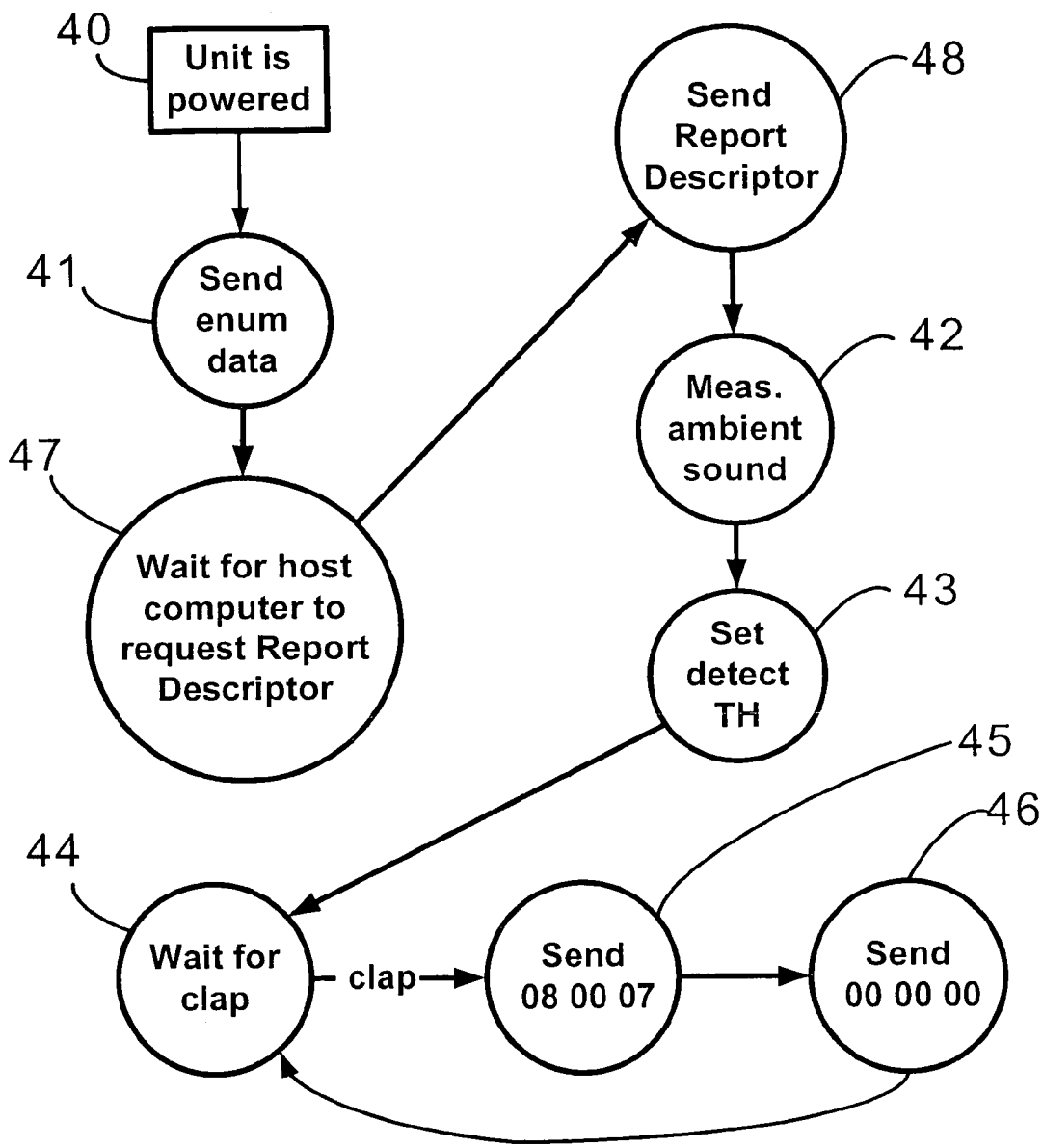
FIG. 4 is a state diagram of the system of FIG. 1.

Considering now the device 1 in more detail with reference to FIG. 4, there is shown a state diagram for a program running in microprocessor 15 (FIG. 3) to implement an embodiment of the present invention. This state diagram may be implemented, in either the low level assembler language for the microprocessor, or using a high level language such as C, C++ or BASIC.

With reference to both FIGS. 2 and 4, when the device 1 (FIG. 2) is plugged into a USB input port such as USB input port 5 (FIG. 2) on a personal computer 8 (FIG. 2), the device 1 is powered by the aforementioned Vbus power line. The program begins operation at state 40 (FIG. 4), where it may wait for the personal computer 8 to enumerate the device. Enumeration is a USB initialization operation which may identify a USB device to the personal computer, and may inform the personal computer 8 (FIG. 2) of the USB device's configuration and requirements.

When the enumeration state 41 (FIG. 4) is complete, the device 1 waits for the computer 8 to request a report descriptor in step 47. After the request is received by the device 1, the device 1 sends the report descriptor to the computer 8 as shown in step 48 (FIG. 4).

When the report descriptor is sent in step 48, the program may move to state 42, where it takes a background measurement of the ambient sound level. The program then may move to state 43, where it sets a sound detection threshold sufficiently above the ambient sound level to prevent false triggering of the sound impulse. Having set the threshold, the program may move to state 44, where it may remain until it detects an impulsive sound such as a handclap. When the clap sound or other impulse communication is detected, the program may move to state 45, where it sends the three bytes 08-00-07 over the USB connector 18, which appears to the personal computer operating system to be a user typing the Windows key and "d" key combination, and which may cause the operating system to close all open windows on the display. The program then may move to state 46, where it may send the three bytes 00-00-00 to indicate that all of the keyboard keys have been released. Finally, the program may loop back to state 44 to wait for another clap sound or other impulse communication as described above. It is to be understood that instead of the stored signals shown at 45 and 46, other desired predetermined signals may be stored and retrieved utilizing the device 1, as hereinafter described in greater detail.

In operation, in the present example, the Windows & "d" key activation sequence may have a toggling effect in the Windows operating system. The first occurrence may remove the active windows, the second occurrence may restore them, the third occurrence may remove them again, and so forth. Therefore as the states 44, 45, and 46 are traversed by the program, Windows displays alternately disappear and reappear on the display screen.

Considering now the software in the device 1 in more detail and while referencing Appendices A and B, Appendix A contains a C language listing containing enumeration data which identifies the device 1 as a USB Human Interface Device (HID). Once the host computer 8 identifies the device 1 as belonging to the HID class, the computer 8 requests a report descriptor from the device 1, which describes the device as a keyboard, and specifies the format of the data supplied by the device.

Appendix B contains a C language computer program listing for a report descriptor for the device 1. The listing specifies that the device 1 send a first byte that indicates a key modifier such as 08 to indicate a Windows key, a second byte that is always set to zero, and a third byte that contains a keycode such as 07 for the letter "d". This particular key report of 08-00-07 is used in state 45 (FIG. 4) to simulate the user holding down a Windows key and striking the "d" key, which may cause a personal computer running the Windows operating system to collapse all user windows on the display screen in the present example.

These and other details of the standard HID class are described in the USB document, *Device Class Definition for Human Interface Devices (HID) Version* 1.1, and *HID Usage Tables Version* 1.11, both documents available for download at the web site www.usb.org.

It should be appreciated that the state diagram in FIG. 4 illustrates one possible action of the disclosed embodiment of the invention as the device 1 reacts to an external stimulus. Any signals that can be sent to appear as keystrokes typed at a standard personal keyboard may be sent in response to the external stimulus. To give three examples, sending the byte sequence 01-00-29 simulates the user striking the CTRL+ESC keyboard keys, which instructs the Windows operating system to open its Start menu. Sending the byte sequence 04-00-3D simulates the user striking the ALT+F4 keys, which instructs the Windows operating system to quit the program in the currently selected window. Finally, sending the byte sequence 00-04-2B simulates the user striking the ALT+TAB keys, which instructs the Windows operating system to switch between active programs currently running. If the detected influence is a handclap, each clap would cycle control between the currently running Windows programs.

Similarly, the microprocessor 15 (FIG. 3) may be configured and programmed to respond to external stimuli other than sounds detected by a microphone, and it may respond to sequences of stimuli instead of single events. For example, for a system using a microphone to detect sound stimuli such as a handclap, one clap may initiate a first action, and two claps, spaced together within a certain interval, may initiate a second action, and so forth.

Figure 5:
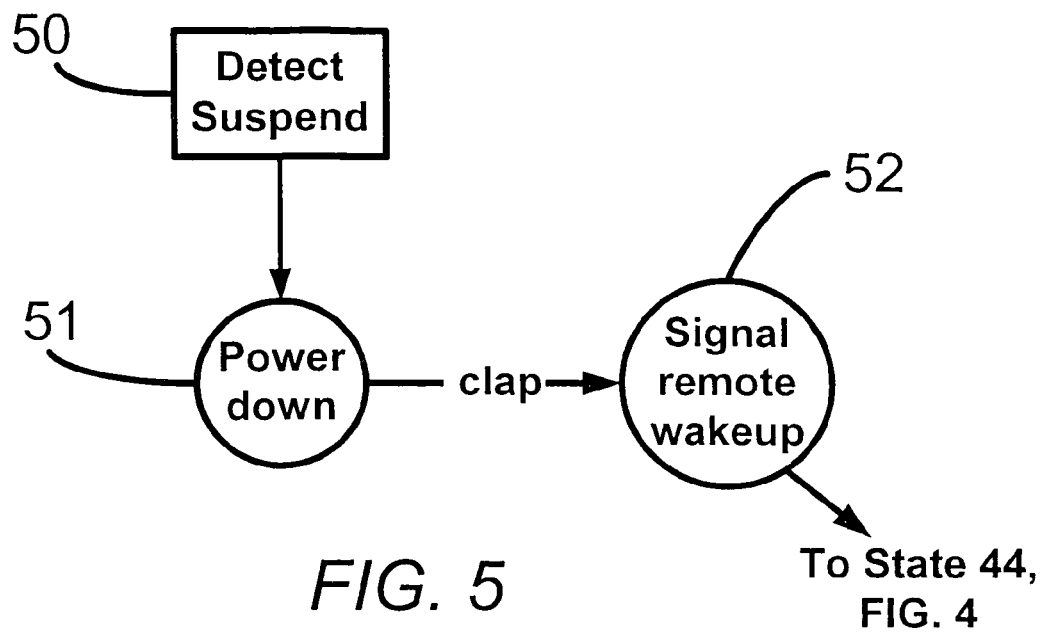
FIG. 5 is a state diagram of the system of FIG. 1 for use in resuming operation from a standby state of operation.

With reference to FIG. 5, there is shown a state diagram of how the invention may wake up a personal computer 2 (FIG. 2) that is in a low power standby state. A USB device 1 (FIG. 4) may be put into a unique state such as a suspended state when the personal computer 2 (FIG. 2) ceases sending traffic to the device 1 for approximately 3 milliseconds. USB input ports are suspended in this manner prior to the personal computer 2 (FIG. 2) entering its low power standby state. The program detects this suspended state at state 50, and transitions to state 51 where the device 4 enters a low power mode in which it consumes no more than 500 microamps. When an impulsive communication is detected by the device 4, the program may move to state 52, where the device places the "remote wakeup" signal on the USB bus lines, instructing the personal computer (FIG. 2) to resume its operational state. The program then proceeds to state 44 (FIG. 5) thereby resuming its normal operation.

Figure 6:
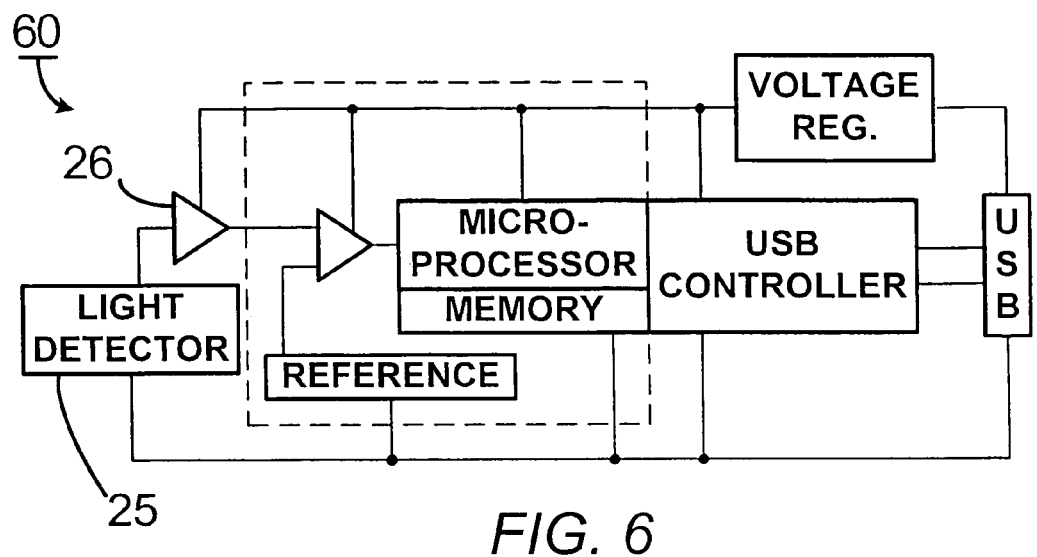
FIG. 6 is a circuit diagram of another impulsive communication activated computer control device constructed in accordance with another embodiment of the present invention.

Referring now to FIG. 6, another impulsive communication computer control device 60 is shown and is constructed according to another embodiment of the present invention. The device 60 is similar to device 1 except that device 60 detects impulse communications that are formed from light. To detect light, the device 60 includes a circuit similar to the circuit shown in FIG. 3, except that the microphone 11 (FIG. 3) and amplifier 12 (FIG. 3) are replaced by a photo or light detector 25 (FIG. 4) and photo amplifier 26, respectively.

Thus, instead of detecting sound, this circuit detects impulsive communications in the form of predetermined light signals to initiate the sending of keycodes over a USB input port of a computer such as the computer 8 (FIG. 2), to simulate a personal computer keyboard as described heretofore.

In general, the detected impulsive communication may be a predetermined stimuli including, but not limited to, sound patterns. For example, the light detector 25 (FIG. 6) may replace the microphone 11 (FIG. 3) and serve to send keyboard codes to the computer such as the computer 8 when a light beam is detected or broken by the device 60. Alternatively, for example, a heat detector (not shown) or a motion sensor (not shown) may sense the presence of a person and send computer keycodes. Another example of an impulsive communication may be sensed by a vibration sensor (not shown) mounted on the inside cover of the desktop computer 8, so that striking the computer 8 serves to send computer keycodes. These and other stimuli may be used alone or in combination.

Figure 7:
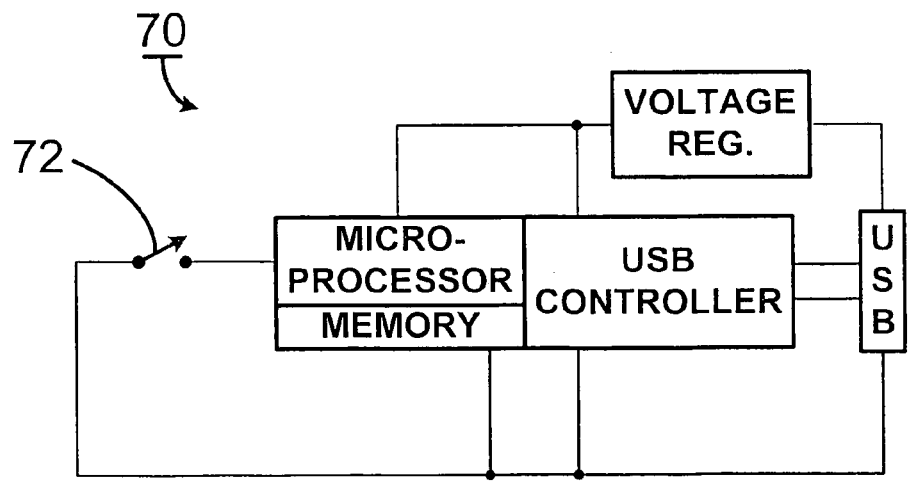
FIG. 7 is a circuit diagram of still another impulsive communication activated computer control device constructed in accordance with still another embodiment of the present invention.

Referring now to FIG. 7, there is shown another impulsive communication computer control device 70, which is constructed in accordance with another embodiment of the present invention. The device 70 is similar to the device 1 and the device 60, except the device 70 detects impulsive communications in response to the closure of a manual switch 72 for the purpose of sending computer keycodes. It should be noted that unlike the device 1 and the device 60, amplifiers, comparators and reference circuits are not required in this embodiment.

While particular embodiments of the present invention have been disclosed, it is to be understood that various different modifications are passing and one contemplated within the true spirit and scope of the appended claims. For example, the microprocessor 15 may be an ASIC. There is no intention, therefore, of limitations to the exact abstract or disclosure herein presented.

```
// Appendix A
// Enumeration data for a USB HID (Human Interface Device) keyboard
unsigned char DD [ ]=      // DEVICE Descriptor
    {0x12,                 // bLength = 18d
    0x01,                  // bDescriptorType = Device (1)
    0x00,0x01,             // bcdUSB(L/H) USB spec rev (BCD)
    0xFF,0xFF,0xFF,        // bDeviceClass, bDeviceSubClass, bDeviceProtocol
    0x40,                  // bMaxPacketSize0 EP0 is 64 bytes
    0x6A,0x0B,             // idVendor(L/H) --Maxim is 0B6A
    0x46,0x53,             // idProduct(L/H) --5346
    0x34,0x12,             // bcdDevice--1234
    0,0,0,                 // iManufacturer, iProduct, iSerialNumber
    1};                    // bNumConfigurations
unsigned char CD [ ]=      // CONFIGURATION Descriptor
    {0x09,                 // bLength
    0x02,                  // bDescriptorType = Config
    0x22,0x00,             // wTotalLength(L/H) = 34 bytes
    0x01,                  // bNumInterfaces
    0x01,                  // bConfigValue
    0x00,                  // iConfiguration
    0xE0,                  // bmAttributes. b7=1 b6=self-powered b5=RWU suppported
    0x32,                  // MaxPower is 50 ma
// INTERFACE Descriptor
    0x09,                  // length = 9
    0x04,                  // type = IF
    0x00,                  // IF #0
    0x00,                  // bAlternate Setting
    0x01,                  // bNum Endpoints
    0x03,                  // bInterfaceClass = HID
    0x00,0x00,             // bInterfaceSubClass, bInterfaceProtocol
    0x00,                  // iInterface
// HID Descriptor
    0x09,                  // bLength
    0x21,                  // bDescriptorType = HID
    0x10,0x01,             // bcdHID(L/H) Rev 1.1
    0x00,                  // bCountryCode (none)
    0x01,                  // bNumDescriptors (one report descriptor)
    0x22,                  // bDescriptorType (report)
    43,0x00,               // wDescriptorLength. report descriptor size is 43 bytes)
// Endpoint Descriptor
    0x07,                  // bLength
    0x05,                  // bDescriptorType (Endpoint)
    0x83,                  // bEndpointAddress (EP3-IN)
    0x03,                  // bmAttributes (interrupt)
    0x40,0x00,             // wMaxPacketSize (64)
    0xFF};                 // bInterval (poll every 255 msec)
```

```
// Appendix B
// Report descriptor for a HID keyboard
unsigned char RepD [ ]=    // Report descriptor
    {
    0x05,              // bDescriptorType (report)
    0x01,              // Usage Page (generic desktop)
    0x09,0x06,         // Usage
    0xA1,0x01,         // Collection
    0x05,0x07,         //   Usage Page 7 (Keyboard/Keypad)
    0x19,0xE0,         //     Usage Minimum = 224
    0x29,0xE7,         //     Usage Maximum = 231
    0x15,0x00,         //     Logical Minimum = 0
    0x25,0x01,         //     Logical Maximum = 1
    0x75,0x01,         //     Report Size = 1
    0x95,0x08,         //     Report Count = 8
    0x81,0x02,         //     Input(Data,Variable,Absolute)
                       FIRST byte is key modifier
    0x95,0x01,         //     Report Count = 1
    0x75,0x08,         //     Report Size = 8
    0x81,0x01,         //     Input(Constant) SECOND byte is 00
    0x19,0x00,         //     Usage Minimum = 0
    0x29,0x65,         //     Usage Maximum = 101
    0x15,0x00,         //     Logical Minimum = 0,
    0x25,0x65,         //     Logical Maximum = 101
    0x75,0x08,         //     Report Size = 8
    0x95,0x01,         //     Report Count = 1
    0x81,0x00,         //     Input(Data,Variable,Array)
                       THIRD byte is keystroke
    0xC0};             // End Collection
```

What is claimed is:

1. A method for controlling a computer having an operating system via a USB port engageable device in a self-contained compact package having a USB output connector for connecting to a computer USB input port, the device including a microprocessor and a memory and having a housing being substantially smooth on all sides, comprising:
   storing enumeration data in the memory to describe the device as a human interface device to the computer;
   storing report descriptor data in the memory to describe the device as a keyboard to the computer;
   storing in the memory a single byte sequence corresponding to preselected keyboard emulating signals to instruct the operating system of the computer to switch from an active program currently running to another desired program, each program having a respective active computer display;
   detecting an impulsive communication in the form of a sharp sound;
   generating an impulsive signal in response to the detected impulsive communication;
   responding to the impulsive signal to generate a start signal;
   retrieving and sending in response to the start signal the enumeration data to the computer identifying the device as a human interface device to the computer;
   retrieving and sending the report descriptor data to the computer in response to a request from the computer to describe the device as a keyboard to the computer;
   responding to the start signal using the microprocessor for retrieving and sending the stored single byte sequence corresponding to the preselected keyboard emulating signals to the operating system of the computer via the USB output connector to switch from the currently running active program; and
   commanding the operating system of the computer via the USB connector to switch between the initial active computer display and the desired active computer display in accordance with the single byte sequence,
   wherein the operating system of the computer remains in an active state with the active program associated with the desired active computer display being available to the user for immediate use,
   wherein the number of preselected keyboard emulating signals being stored is substantially fewer than the number of conventional keyboard signals in a conventional keyboard, and
   wherein the desired active computer display and its active program are stored externally from the device.

2. A method as recited in claim 1, further including:
   generating a second start signal; and
   responding to the second start signal via the microprocessor for retrieving and sending preselected keyboard emulating signals to control the operating system of the computer via the USB output connector to switch from the currently active running program.

3. A method as recited in claim 2, wherein the first start signal clears an active window on the computer and the second start signal restores the active window on the computer.

4. A method as recited in claim 1, further including receiving power from the USB input port of the computer via the USB output connector.

5. A method as recited in claim 4, wherein generating the start signal is responsive to receiving power from the USB input port of the computer.

6. A method as recited in claim 1, wherein generating the start signal includes using a sensor.

7. A method as recited in claim 1, wherein the generating of the start signal also includes operating a manually operable switch.

8. A method as recited in claim 1, further including:
   detecting a signal from the computer indicating its unique state;
   subsequently generating a second set of preselected keyboard emulating signals via the USB output connector upon generation of another start signal, the second set of preselected keyboard emulating signals being related to the unique state.

9. A method for controlling a computer having an operating system via a USB port engageable device in a self-contained compact package having a USB output connector for connecting to a computer USB input port, the device including a microprocessor and a memory and having a housing being substantially smooth on all sides, comprising:
   storing enumeration data in the memory to describe the device as a human interface device to the computer;
   storing report descriptor data in the memory to describe the device as a keyboard to the computer;
   storing in the memory a single byte sequence corresponding to preselected keyboard emulating signals to instruct the operating system of the computer to run a desired program with a desired active computer display over an initial active computer display;
   wherein the operating system of the computer begins in an initial active state, with an initial program associated with the initial active computer display being available to the user for immediate use;
   detecting an impulsive communication in the form of a sharp sound;
   generating responsive to the detected impulsive communication an impulsive signal;
   generating a start signal responsive to the impulsive signal;
   retrieving and sending in response to the start signal the enumeration data to the computer identifying the device as a human interface device to the computer;

retrieving and sending the report descriptor data to the computer in response to a request from the computer to describe the device as a keyboard to the computer;

responding to the start signal using the microprocessor for retrieving and sending the stored single byte sequence corresponding to the preselected keyboard emulating signals in response to the start signal via the microprocessor to the operating system of the computer via the USB output connector to run the desired program; and commanding the operating system of the computer via the USB connector to open the desired active computer display over the initial active computer display, wherein the operating system of the computer remains in a desired active state with the desired program associated with the desired active computer display being available to the user for immediate use, wherein the number of preselected keyboard emulating signals being stored is substantially fewer than the number of conventional keyboard signals in a conventional keyboard, and wherein the desired active computer display and the desired program are stored externally from the device.

* * * * *